United States Patent
Wakabayashi et al.

(10) Patent No.: US 8,476,795 B2
(45) Date of Patent: Jul. 2, 2013

(54) ELECTRIC WATER PUMP

(75) Inventors: Keisuke Wakabayashi, Gunma-ken (JP); Masanori Umeno, Gunma-ken (JP); Nobuyuki Kabasawa, Gunma-ken (JP)

(73) Assignee: Yamada Manufacturing Co., Ltd., Kiryu-Shi, Gunma-Ken (JP)

( * ) Notice: Subject to any disclaimer, the term of this patent is extended or adjusted under 35 U.S.C. 154(b) by 260 days.

(21) Appl. No.: 13/064,720

(22) Filed: Apr. 11, 2011

(65) Prior Publication Data

US 2011/0254410 A1    Oct. 20, 2011

(30) Foreign Application Priority Data

Apr. 19, 2010   (JP) .................................. 2010-95927

(51) Int. Cl.
    *H02K 11/00*    (2006.01)
(52) U.S. Cl.
    USPC .......................................... 310/68 B; 310/71
(58) Field of Classification Search
    USPC ........................ 310/68 B, 68 R, 71, 89, 62–63
    See application file for complete search history.

(56) References Cited

U.S. PATENT DOCUMENTS

| | | | | |
|---|---|---|---|---|
| 4,952,830 | A * | 8/1990 | Shirakawa | 310/68 B |
| 5,744,886 | A * | 4/1998 | An | 310/91 |
| 7,474,024 | B2 * | 1/2009 | Nakanishi | 310/71 |
| 2002/0047347 | A1 * | 4/2002 | Torii et al. | 310/68 B |
| 2006/0006747 | A1 * | 1/2006 | Kadowaki | 310/68 B |
| 2007/0145838 | A1 * | 6/2007 | Uchitani et al. | 310/68 B |
| 2007/0290568 | A1 * | 12/2007 | Ihle et al. | 310/257 |
| 2008/0211332 | A1 * | 9/2008 | Kataoka et al. | 310/71 |
| 2010/0164333 | A1 * | 7/2010 | Uchimura et al. | 310/68 B |
| 2010/0283339 | A1 * | 11/2010 | Kitai | 310/71 |
| 2011/0006625 | A1 * | 1/2011 | Fujii et al. | 310/71 |

FOREIGN PATENT DOCUMENTS

JP    2001-304167    10/2001

* cited by examiner

*Primary Examiner* — Thanh Lam
(74) *Attorney, Agent, or Firm* — McGinn IP Law Group, PLLC

(57) ABSTRACT

In a circuit substrate of an electric water pump, a Hall IC can be mounted on a circuit substrate at an optimum position in a stable and durable state. The electric water pump includes a motor housing, a stator constituted by a stator core covered by a resin insulator and a coil, a circuit substrate, a holder 6 mounted on the circuit substrate, and a Hall IC mounted on the holder. A holder accommodation portion, into which the holder is inserted, is formed in the insulator, the stator is disposed in and fixed to the motor housing, the circuit substrate is appropriately mounted on the motor housing, and the holder 6 is inserted into and supported by the holder accommodation portion.

2 Claims, 5 Drawing Sheets

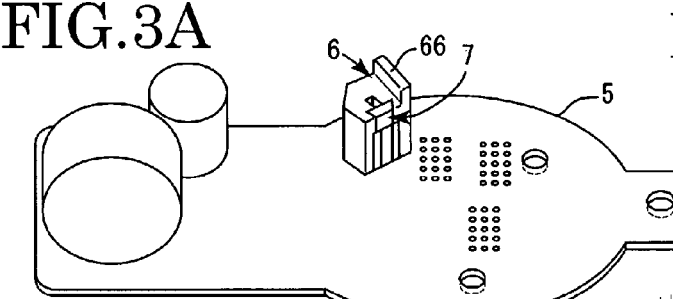
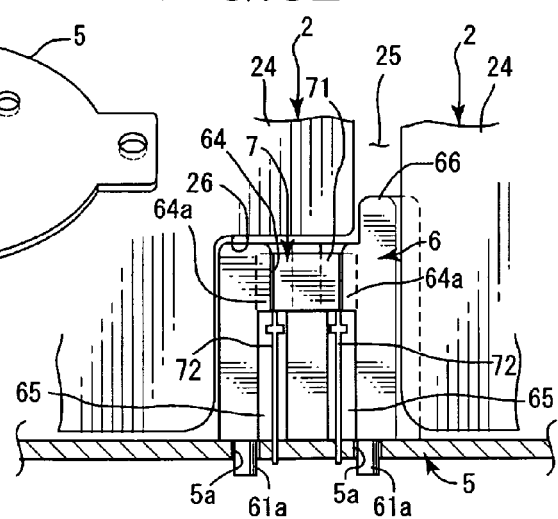

ELECTRIC WATER PUMP

BACKGROUND OF THE INVENTION

1. Field of the Invention

The present invention relates to an electric water pump in which a Hall IC can be mounted on a circuit substrate at an optimum position in a stable and durable state.

2. Description of the Related Art

Following recent advances in development of electric and hybrid vehicles, the number of electric water pumps installed on the vehicles has increased. Most of the electric water pumps that are presently used are the so-called integrated electric water pumps in which a section having a motor function and a section having a pump function are integrated together. The integrated electric water pump has disposed therein a stator constituted by a coil and a stator core serving as a motor stator, an inner magnet serving as a motor rotor, and an impeller integrated with the inner magnet. The magnetic force of the stator is controlled by controlling the energizing of the coil, and the inner magnet is rotated continuously and smoothly.

Since the stator is fixed and the inner magnet rotates, a relative angle of magnetic poles of the stator and magnetic poles of the inner magnet change with the passage of time. Further, a magnetic force of a certain predetermined value is generated in the stator at a certain predetermined relative angle of the magnetic poles of the stator and the magnetic poles of the inner magnet, thereby rotating the inner magnet continuously and smoothly. A Hall IC is generally widely used as a means for detecting a position (phase) of the magnetic poles of the inner magnet in the angular direction from time to time and measuring the orientation and intensity of magnetic field by measuring the intensity of magnetic field of the inner magnet in order to attain such smooth and continuous operation.

SUMMARY OF THE INVENTION

Japanese Patent Application Laid-open No. 2001-304167 discloses an example of configuration for detecting a phase of magnetic poles of the inner magnet with a Hall IC. In the configuration shown in FIG. 3 and the conventional configuration described in Japanese Patent Application Laid-open No. 2001-304167, a magnetizing portion (3c) is provided at an impeller (3), and a detection portion (9) is provided for measuring the intensity of magnetic field of the magnetizing portion (3c). The detection portion (9) is fixed and wired to a holding portion (9a) formed integrally with a printed substrate (7). A control unit (10) is disposed for supplying drive power for rotating the impeller (3) to the coil (6) according to the electric signal from the detection portion (9).

However, since the magnetic flux of the magnetizing portion (3c) magnetized on the inner surface of the cylindrical portion (3a) is picked up as a detection signal for detecting the rotational position of the impeller (3), the detection portion (9) should be disposed at a position opposite the magnetizing portion (3c) located at a position apart from the printed substrate (7), with the elongated holding portion (9a) being disposed between the detection portion and the magnetizing portion, and the positional accuracy necessary for detection is difficult to ensure due to deformation of the holding portion (9a). Further, since the impeller (3) is supported on the fixed shaft (15) in a cantilever fashion, the cylindrical portion (3a) can easily swing, thereby changing the gap between the cylindrical portion and the detection portion (9). As a result, the positional accuracy necessary for detection is difficult to ensure.

Further, in the configuration described in the example of embodiment and shown in FIG. 1, a coil (6) is coupled to a printed substrate (22) by terminals (13a, 13b), and the stator (5) and the printed substrate (22) are not individually directly connected and fixed. Therefore, the relative position of the stator (5) and the printed substrate (22) includes an error at the time of assembly. As a result, the relative position of the stator (5) and the detection portion (21) also includes the assembling error. Thus, it is possible that the switching timing of magnetic poles of the stator (5) includes an error, and a limitation is placed on the performance and characteristics of the motor.

The detection portion (21) is surface mounted at a position corresponding to the axial direction of the distal end surface (20b) of the impeller (20). The resultant problem is that the axial length of the entire pump is increased. The problem to be resolved (technical problem to be resolved or the object to be attained) by the present invention is to enable stable and durable mounting of a Hall IC at an optimal position in a circuit substrate of an electric water pump and to provide a very simple configuration.

The inventors have conducted a comprehensive study to resolve the above-described problem, and the results obtained demonstrated that the abovementioned problem can be resolved by an electric water pump according to the aspect of the present invention, the electric water pump including a motor housing, a stator constituted by a stator core covered by a resin insulator and a coil, a circuit substrate, a holder mounted on the circuit substrate, and a Hall IC mounted on the holder, wherein a holder accommodation portion, into which the holder is inserted, is formed in the insulator, the stator is disposed in and fixed to the motor housing, the circuit substrate is appropriately mounted on the motor housing, and the holder is inserted into and supported by the holder accommodation portion.

In accordance with the aspect of the present invention, the holder for mounting a Hall IC is provided and the holder is fixed to the circuit substrate. The holder accommodation portion that accommodates the holder is provided in the insulator of the stator. Therefore, only by fixing the stator and the circuit substrate to the motor housing, it is possible to fix the holder, which has the Hall IC mounted thereon, in a stable state by the circuit substrate and the holder accommodation portion, and the holder can be attached at a correct position with a very simple configuration. Further, since the holder accommodation portion is formed in the insulator of the stator and the holder is accommodated therein, the electric water pump is not increased in size in the radial and axial directions and space can be saved. This is because the increase in space is prevented by using the interior of the insulator, which is a member that should be disposed in the pump, as the holder accommodation portion.

BRIEF DESCRIPTION OF THE DRAWINGS

FIG. 3A is a perspective view of the circuit substrate and the holder, and FIG. 3B is a view taken along the Y1-Y1 arrow in FIG. 2A;

DETAILED DESCRIPTION OF THE PREFERRED EMBODIMENTS

Figure 1A:
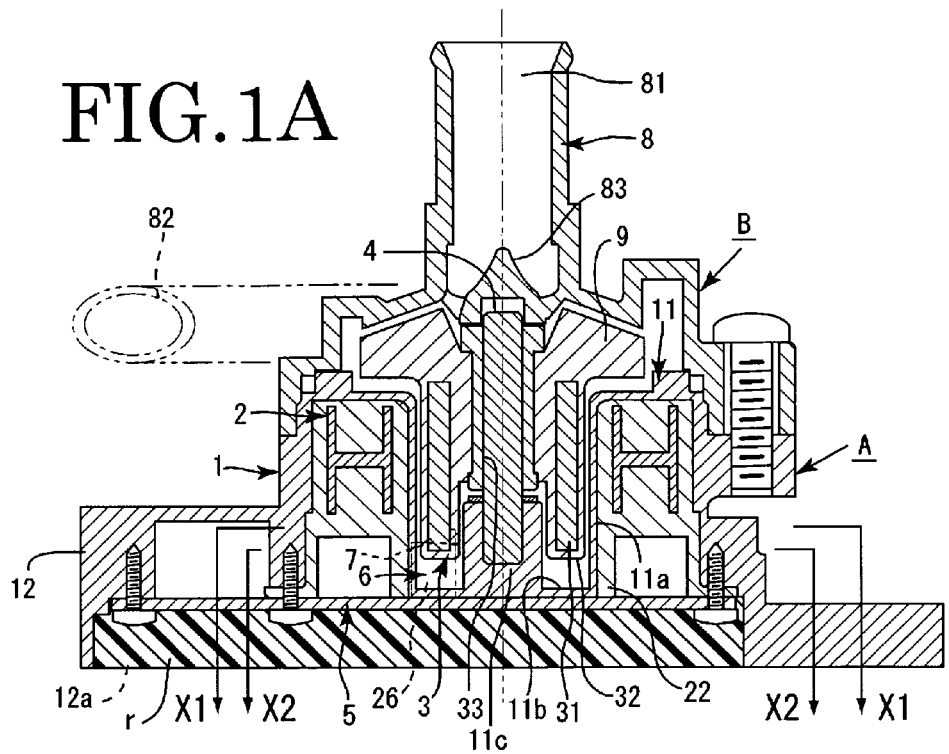
FIG. 1A is a vertical sectional view of the electric water pump in accordance with the present invention.

A first embodiment of the present invention will be described below with reference to the appended drawings. As shown in FIG. 1A, the configuration in accordance with the present invention is constituted by a motor section A and a pump section B. The motor section A is constituted by a motor housing 1, a stator 2, an inner magnet 3, a shaft 4, a circuit substrate 5, a holder 6, and a Hall IC 7. The motor housing 1 is made from a resin, and the stator 2 and the inner magnet 3 are disposed inside thereof.

Figure 1B:
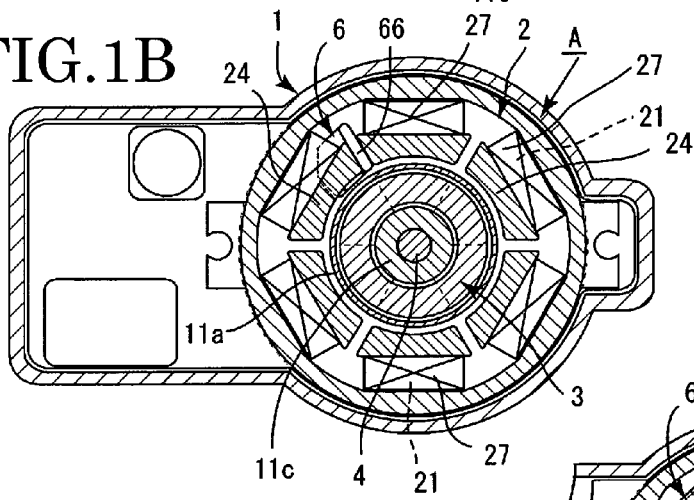
FIG. 1B is a sectional view taken along the X1-X1 arrow in FIG. 1A.
Figure 1C:
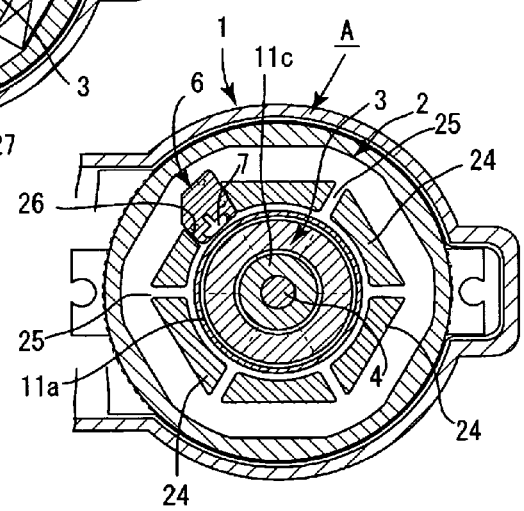
FIG. 1C is a sectional view taken along the X2-X2 arrow in FIG. 1A.

A partition wall portion 11 in the form of a cylindrical cup is formed in the motor housing 1 (see FIG. 1). The partition wall portion 11 is constituted by a circumferential portion 11a and a bottom portion 11b, and a shaft support portion 11c is formed in the bottom portion 11b (see FIG. 1A). The shaft 4 is mounted on the shaft support portion 11c. The inner magnet 3 is rotatably supported by the shaft 4 on the inside of the partition wall portion 11, and the stator 2 is mounted on the outside of the circumferential portion 11a of the partition wall portion 11. Thus, a structure is obtained in which the stator 2 and the inner magnet 3 are water-tightly partitioned by the partition wall portion 11.

In the motor housing 1, a housing base 12 is formed from the opening of the partition wall portion 11 outwardly. A base opening 12a is formed in the lower surface of the housing base 12, and the stator 2 and the circuit substrate 5 are mounted from the base opening 12a inside the motor housing 1. The specific configuration of the stator 2 will be described below.

The below-described impeller 9 is formed integrally with the inner magnet 3. In the inner magnet 3, a cylindrical magnet member 31 is covered with a magnet outer tubular portion 32 made from a resin, and a shaft hole 33 for inserting the shaft 4 is formed in the diametrical center of the magnet member 31. In the inner magnet 3, an even number of magnetic poles are formed with an equal angular spacing in the circumferential direction (see FIG. 2B). In the magnet member 31, the magnet outer tubular portion 32 made from a resin may be formed integrally by using a plastic magnet.

The circuit substrate 5 is disposed in the base opening 12a so as to be close to the bottom portion 11b of the partition wall portion 11 of the motor housing 1, and the circuit substrate 5 is arranged inside the motor housing 1 so as to be perpendicular to the shaft 4. A group of electronic components that supply electric power to the coil and a group of electronic components that control the group of electronic components supplying the electric power are disposed at the circuit substrate 5. Electric power is supplied to the electronic components located on the circuit substrate 5 from a connector formed integrally with the motor housing 1.

The entire region of the circuit substrate 5 and the motor unit A is covered with a sealing resin r by pouring the sealing resin r from the base opening 12a of the motor housing 1 and curing the resin by heating. With such a configuration, the members other than the pump section B, such as the stator 2, the circuit substrate 5, and the electronic components located on the circuit substrate 5 are enclosed in the sealing resin r. The sealing resin r has heat dissipation, dust proofing, and waterproofing functions.

The Hall IC 7 is a sensor serving to detect phases of the magnetic poles of the inner magnet 3. Electric power is supplied sequentially to the coil 27 of the stator 2 in order to rotate the inner magnet 3 smoothly and continuously. The timing for supplying the electric power of the coil 27 is determined by detecting the phase (angular position) of the magnetic poles of the inner magnet 3. The Hall IC 7 is a sensor that measures the direction and intensity of magnetic field, the phases of the magnetic poles of the inner magnet 3 are detected by the Hall IC 7, control is performed on the basis of the magnetic pole phases, and electric power is supplied to the coil 27 in an adequate amount at an adequate timing. The Hall IC 7 is mounted on the holder 6.

Figure 4A:
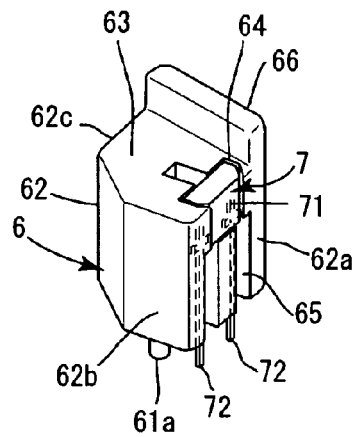
FIG. 4A is a perspective view illustrating a state in which the Hall IC is mounted on the holder.
Figure 4B:
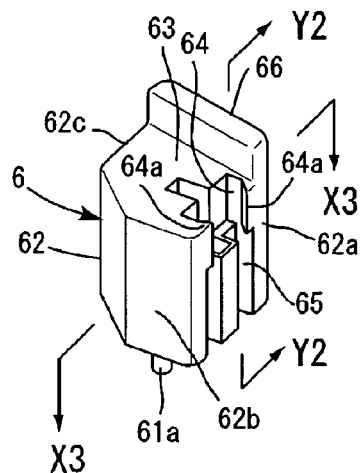
FIG. 4B is a perspective view of the holder.
Figure 4C:
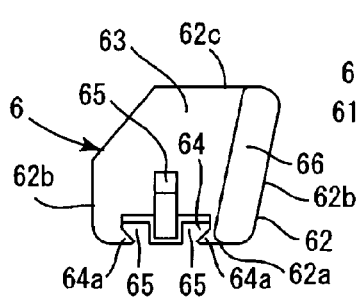
FIG. 4C is a plan view of the holder.
Figure 4D:
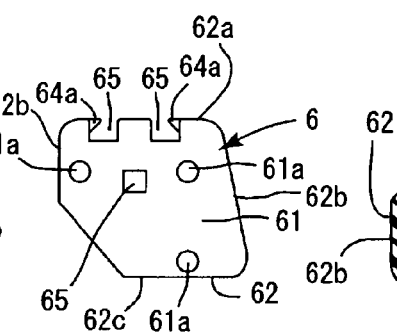
FIG. 4D is a bottom view of the holder.
Figure 4E:
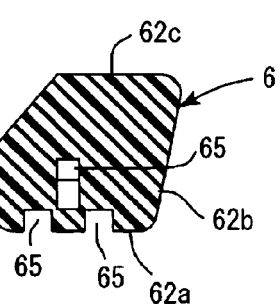
FIG. 4E is a sectional view taken along the X3-X3 arrow in FIG. 4B.
Figure 4F:
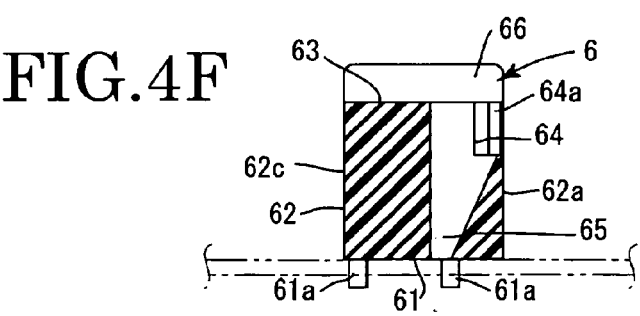
FIG. 4F is a sectional view taken along the Y2-Y2 arrow in FIG. 4B.

The holder 6 is attached at the predetermined location to the circuit substrate 5 (see FIG. 3A). Thus, the circuit substrate 5 is appropriately mounted inside the base opening 12a of the motor housing 1 and then the holder is arranged on the circuit substrate 5 so that the Hall IC 7 is oriented toward the diametrical center of the inner magnet 3 (see FIGS. 1B, 1C, and 2B). As shown in FIGS. 4A to 4E, the holder 6 is formed as a box-like body of a substantially pentagonal columnar shape, and a bottom surface portion 61 at one end in the height direction thereof abuts on the circuit substrate 5 in the predetermined location. The holder 6 is mounted on the circuit substrate 5 by forming three attachment pins 61a, 61a, ... in the form of small protrusions on the bottom surface portion 61 and fixing the holder by inserting the attachment pins 61a, 61a, ... into three attachment holes 5a, 5a, ... formed in the predetermined locations of the circuit substrate 5 (see FIGS. 3B and 4F). The configuration in which the attachment pins 61a of the holder 6 are press fitted into the attachment holes 5a of the circuit substrate 5 is preferred, but if necessary the attachment pins 61a and attachment holes 5a may be fixedly attached to each other with an adhesive.

A side surface portion 62 of the holder 6 is composed of five faces, and when the circuit substrate 5 is appropriately mounted on the housing base 12 of the motor housing 1, the front face 62a is positioned close to the circumferential wall portion 11a of the partition wall portion 11. Of the two transverse side faces 62b, 62b positioned at both sides in the lateral direction of the front face 62a, one transverse side face 62b is formed at a substantially right angle to the front face 62a, and the other transverse side face is formed to obtain an obtuse angle. The front face 62a and a back face 62c are substantially parallel to each other. The remaining faces are not particularly limited.

An element support portion 64 is formed above the front face 62a of the holder 6. The element support portion 64 is a concave accommodation portion for mounting the Hall IC 7 (see FIGS. 4B and 4C). The element support portion 64 is a receding cavity in the form of a substantially rectangular parallelepiped that is configured to enable mounting such that the Hall IC 7 is inserted from the top surface portion 63 of the holder 6 (see FIG. 4A). Protruding ribs 64a, 64a extending in the up-down direction toward the lateral center are formed at both lateral sides of the element support portion 64. The protruding ribs 64a, 64a are formed with a left-right symmetry, and an element main body 71 serving as a detection surface of the Hall IC 7 accommodated in the element support portion 64 is exposed from between the protruding ribs 64a, 64a (see FIG. 4A).

Further, lead support passages 65, 65, having element leads 72, 72, passed therethrough are formed below the element support portion 64. There are three element leads 72, 72, ... of the Hall IC 7, and also three lead support passages 65 are formed. Two lead support passages 65, 65, ... are formed as grooves from the lower end of the element support portion 64 at the front surface 62a of the holder 6, and the remaining one element support portion is formed as a through hole inside the holder 6 (see FIGS. 4C to 4F).

The three element leads 72, 72, ... of the Hall IC 7 are disposed on the circuit substrate 5 so that the distal ends of the element leads constitute triangular apexes. Therefore, the lead support passage 65 located inside the holder 6 is formed such that the distance from this lead support passage to other lead support passages 65, 65 gradually increases with the transition to the bottom surface portion 61 of the holder 6. In this case, in the lead support passage 65 formed as a through hole inside the holder 6, an opening of a substantially rectangular shape is formed at the lower end of the element support portion 64, and this opening is formed to narrow down gradually in the direction toward the bottom surface portion 61 so as to assume a substantially square shape (see FIG. 4F). A fixing protruding rib 66 is formed along one transverse side face 62b at a top surface portion 63 of the holder 6 (see FIGS. 4B and 4C). The fixing protruding rib 66 is formed along the entire length of the transverse side face 62b.

Figure 2A:
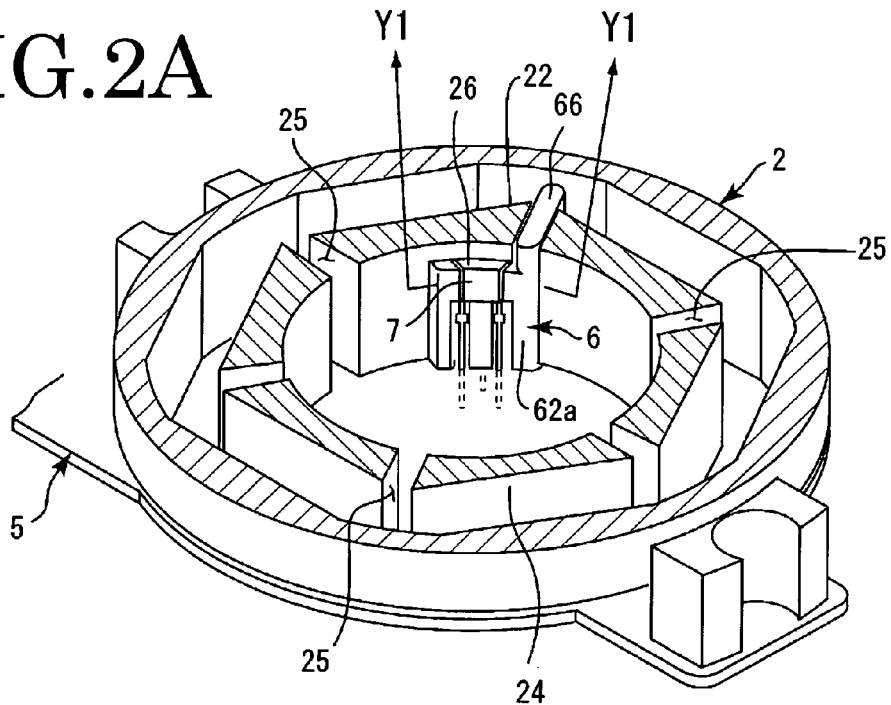
FIG. 2A is a partially cut-out perspective view illustrating a state in which the stator, circuit substrate, and holder are assembled together.
Figure 2B:
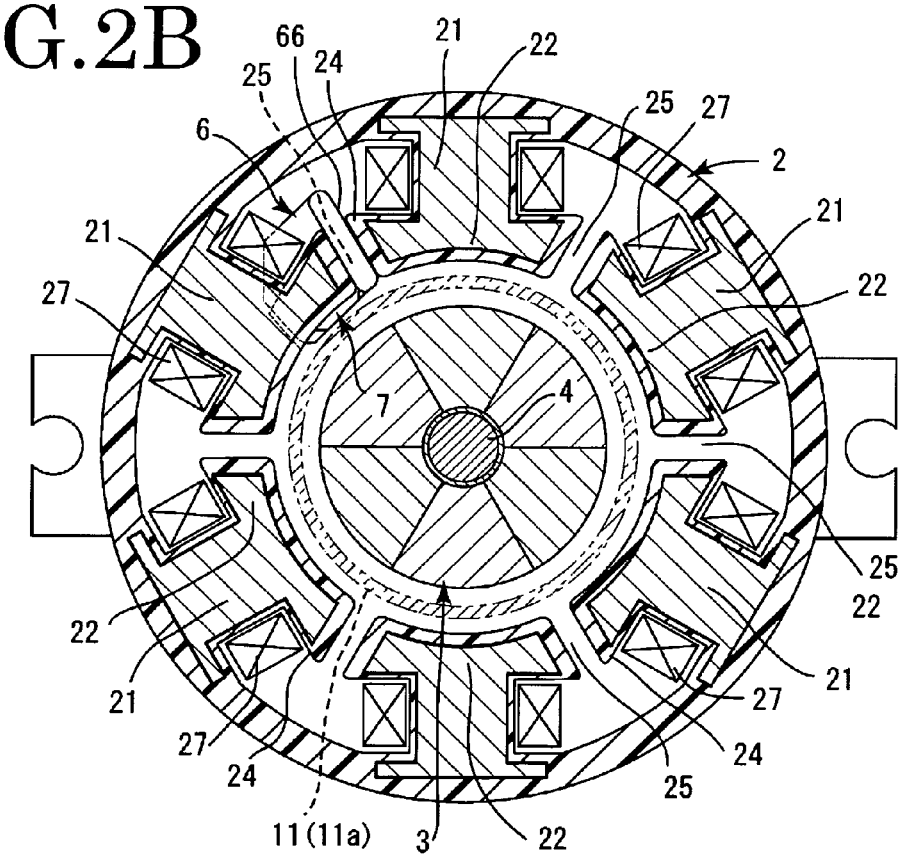
FIG. 2B is a plan view with a lateral section illustrating a state in which the stator, circuit substrate, and holder are assembled together.
Figure 5A:
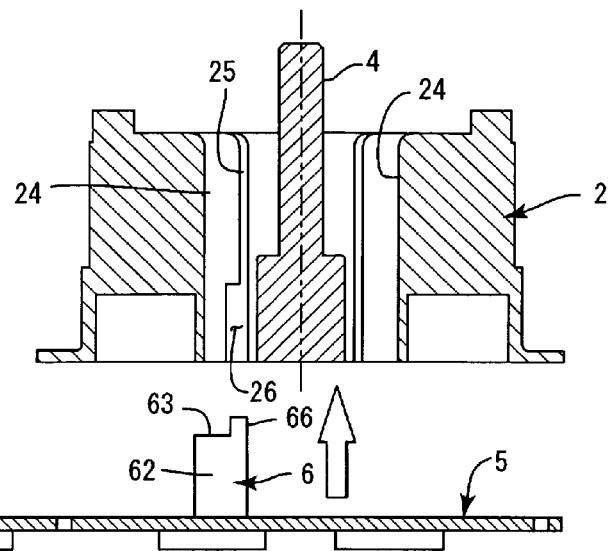
FIG. 5A is a cross-sectional view illustrating how the stator and the circuit substrate having the holder mounted thereon are assembled.
Figure 5B:
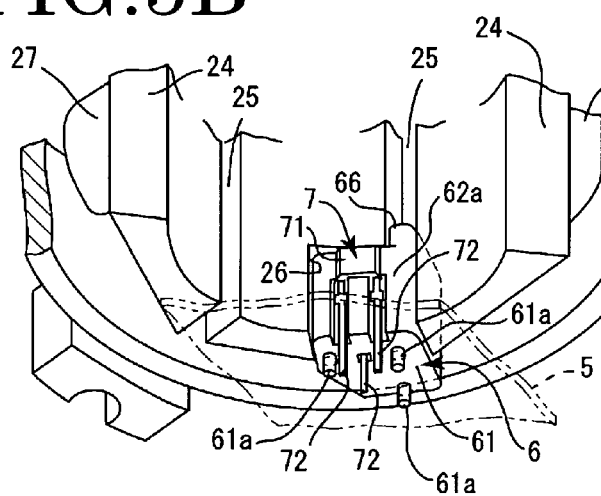
FIG. 5B is a partially cut-out perspective view illustrating the state in which the holder is mounted on the stator.
Figure 5C:
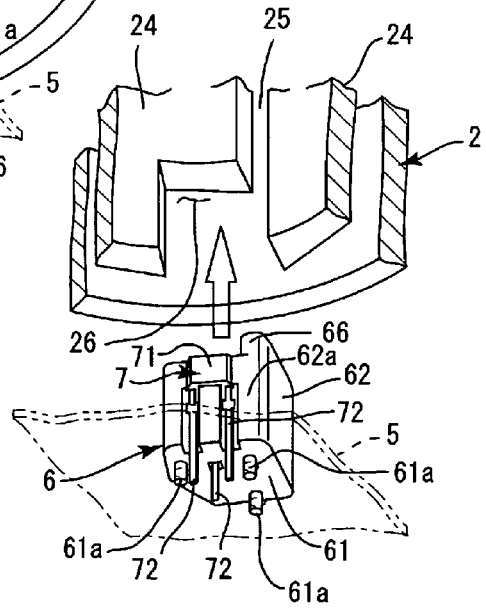
FIG. 5C is a partially cut-out perspective view illustrating how the holder is assembled with the stator.

A holder accommodation portion 26 is formed in an insulator 24 of the stator 2 (see FIGS. 2A, 3B, and 5B). The stator 2 has a plurality of magnetic poles formed therein and is constituted by a stator core 21 composed of an iron alloy, a teeth portion 22, the resin insulator 24 that covers the stator core 21, and a coil 27 that is wound in a multiplicity of turns about the insulator 24 and the stator core 21 (see FIG. 2B). The stator core 21 and the teeth portion 22 are formed integrally and disposed so that the stator core 21 is on the outer circumferential side and the teeth portion 22 is on the inner circumferential side and the stator core and the teeth portion are covered by the resin insulator 24, thereby constituting the stator 2 having a perfect toroidal shape (see FIG. 2B).

As mentioned hereinabove, the outer circumference of the stator 2 has a perfect toroidal shape, and slots 25, 25, ... which are cavities separated from each other are present in the insulator 24 in locations adjacent to the teeth portions 22, 22, ... arranged in a toroidal configuration on the inner circumference. An even number of the stator cores 21 and an even number of the teeth portion 22 are provided, the specific even number being six. Therefore, a total of six slots 25, 25, ... are present.

The thin resin insulator 24 is formed to cover substantially the entire stator core 21. In other words, the stator core 21 is covered by the resin insulator 24, and the coil 27 is wound on the stator core 21, with the insulator 24 being interposed therebetween. The insulator 24 includes portions that cover the stator core 21 and the teeth portions 22 and also thick portions that include only the resin and do not include the stator core 21 or the teeth portions 22. Thus, the insulator 24 is formed to cover the stator core 21 and the teeth portions 22 and, at the same time, to have a volume larger than that of the stator core 21 and the teeth portions 22 (see FIGS. 1A and 3B).

The portion of the insulator 24 that is close to the circuit substrate 5 is constituted so as to include only thick resin portions, thereby making it possible to avoid completely the interference with the stator core 21 and the teeth portions 22 even though the holder accommodation portion 26 is formed (see FIG. 3B). As mentioned hereinabove, thick portions that include only the resin and do not include the stator core 21 or the teeth portions 22 are present inside the insulator 24 at a position below the stator 2. The holder accommodation portion 26 is formed in the thick portion composed only of the resin, the holder 6 is accommodated in the holder accommodation portion 26, and the fixing protruding rib 66 is inserted into the slot 25 (see FIGS. 2 and 3B).

The site where the holder accommodation portion 26 of the stator core 21 is formed is the farthest from the inner magnet 3, and as mentioned above, the stator core 21 and the teeth portions 22 are not present in this portion. Even though this portion is the farthest from the inner magnet 3, this is the range in which the Hall IC 7 can measure magnetic forces in the same manner as in other sites of the inner magnet 3. The holder 6 having the Hall IC 7 mounted thereon is accommodated in the holder accommodation portion 26 of the insulator 24 of the stator 2 fixed to the motor housing 1, and the bottom surface portion 61 of the holder 6 is supported by and fixed to the circuit substrate 5. Further, the fixing protruding rib 66 formed at the top surface portion 63 of the holder 6 is inserted into and supported by the slot 25 of the stator 2.

Thus, the bottom surface portion 61, side surface portion 62, and top surface portion 63 of the holder 6 are all supported (see FIGS. 2A and 3B). As a result, the holder 6 is reliably supported at the upper and lower ends and in the intermediate portion, the Hall IC 7 mounted on the holder 6 is also reliably supported, and even when vibrations transferred from the vehicle or vibrations generated by the pump itself reach the Hall IC 7, the vibrations of the Hall IC 7 are reduced to a minimum, magnetic forces can be accurately measured, and therefore motor control is accurately performed.

The pump section B is constituted by a resin pump cover portion 8 and a resin impeller 9 (see FIG. 1A). The pump cover portion 8 is provided with an intake port 81 serving to intake cooling water, a discharge port 82 serving to discharge the cooling water, and a shaft support portion 83 that supports one axial end of the shaft 4. The impeller 9 is integrally assembled with the inner magnet 3, the impeller 9 is rotated by the action of the motor section A, and the impeller 9 intakes cooling water from the intake port and discharges the cooling water from the discharge port.

A second embodiment of a present invention is the electric water pump according to the first aspect, wherein slits in the form of band-like cavities are formed in a circumferential direction in the insulator 24, the holder accommodation portion 26 is formed continuously with any of the slots, and a fixing protruding rib 66 for insertion into the slot is formed at a top surface portion 63 of the holder 6.

According to the second embodiment of the invention, a fixing protruding rib 66 is formed at a top surface portion 63 of the holder 6, and the fixing protruding rib 66 is inserted into a slot, which is a cavity portion of the stator 2, thereby reliably fixing the upper and lower sides of the holder 6 by the circuit substrate 5 and the slot. As a result, the holder 6 is supported at both ends in the vertical direction, and the hall IC 7 is reliably disposed via the holder 6. Therefore, vibrations of the Hall IC 7 itself can be inhibited even when the pump is subjected to externally induced vibrations. Thus, the magnetic field of the inner magnet 3 can be accurately measured and accurate motor control can be performed with even higher precision.

What is claimed is:

1. An electric water pump comprising a motor housing, a stator constituted by a stator core covered by a resin insulator and a coil, a circuit substrate, a holder mounted on the circuit substrate, and a Hall IC mounted on the holder, wherein a holder accommodation portion, into which the holder is inserted, is formed in the insulator, the stator is disposed in and fixed to the motor housing, the circuit substrate is appropriately mounted on the motor housing, and the holder is inserted into and supported by the holder accommodation portion.

2. The electric water pump according to claim 1, wherein slits in the form of band-like cavities are formed in a circumferential direction in the insulator, the holder accommodation portion is formed continuously with any of the slots, and a fixing protruding rib for insertion into the slot is formed at a top surface portion of the holder.

* * * * *